Sept. 6, 1966  W. HEEMEYER  3,271,020
STEEL PLANT
Filed Nov. 30, 1965
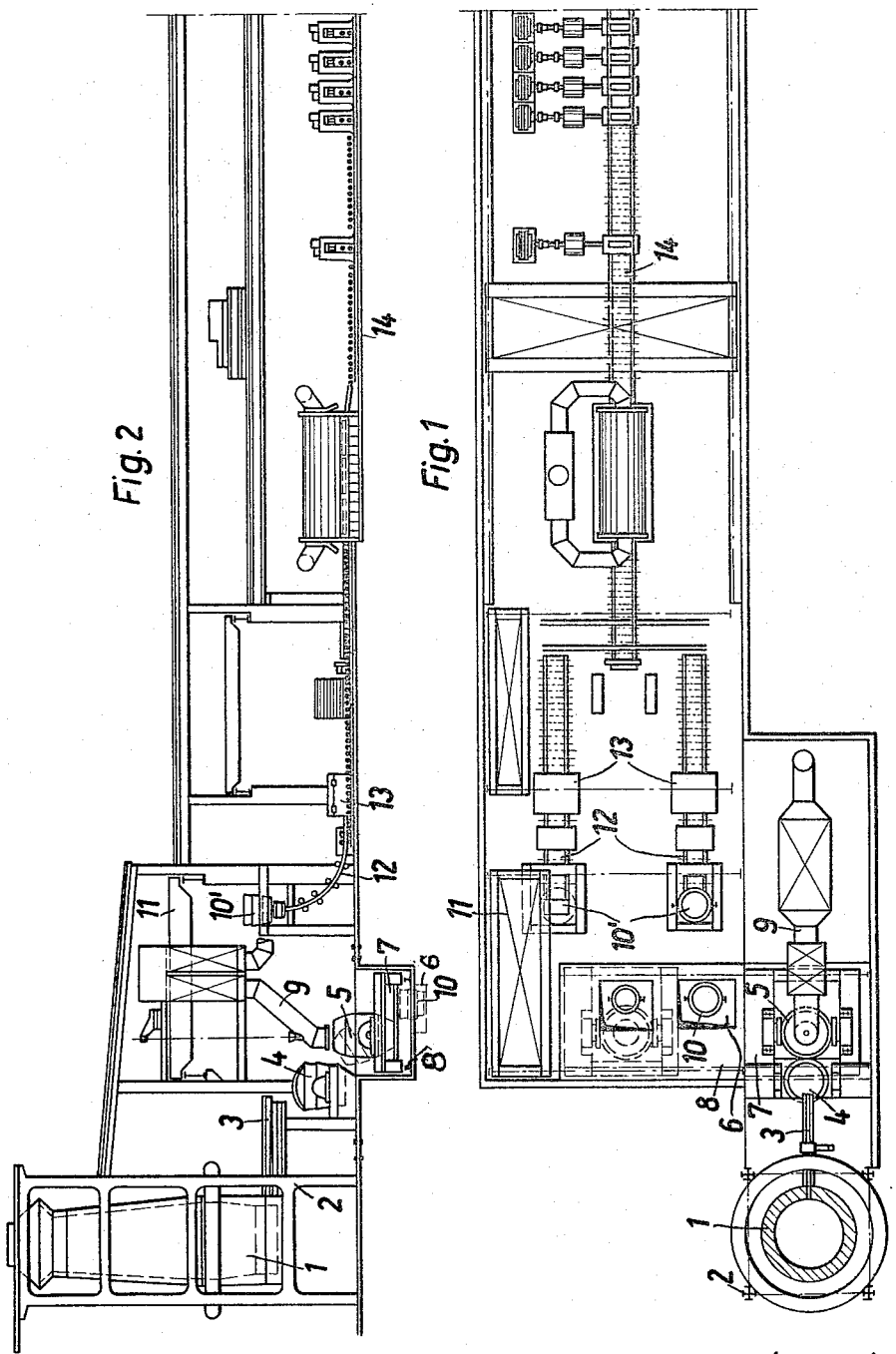
Inventor:
Wilhelm Heemeyer
by Michael S. Striker
Attorney 3,271,020
STEEL PLANT
Wilhelm Heemeyer, Dusseldorf-Kaiserswerth, Germany, assignor to Klockner-Werke AG, Duisburg, Germany
Filed Nov. 30, 1965, Ser. No. 510,612
Claims priority, application Germany, Oct. 11, 1961, K 44,907; Dec. 1, 1964, K 54,675
10 Claims. (Cl. 266—13)

The present invention is a continuation-in-part application of my copending application Serial No. 229,558 entitled "Steel Plant Layout" and filed October 10, 1962.

The present invention relates to a steel plant which is an improvement and further development of the steel plant disclosed in the parent application.

The parent application discloses a steel plant in which blast furnace means are located on one side of a path, and a plurality of steel molding and forming means are located on the other side of the path along lines transverse to the path. Converter means are movable along the path between a position receiving molten iron from the blast furnace means, and a position in which the iron therein is treated by blower means in such a manner that the iron is converted into steel. The blower means are spaced from the blast furnace means along the path, and after the iron in the converter has been transformed into steel at a treating station located along the path and including blower means, the steel is either directly poured into the input of molding and casting means, or first poured into ladles which are raised by cranes to a higher level at which the steel is poured from the ladles into the input of the molding and casting means.

The steel plant layout according to the parent application has the advantage that very little space is required, and that a minimum of transporting means for transporting steel is required due to the fact that the converter means are movable along the path between a position for receiving iron, another position for being treated to convert the iron into steel, and a further position for supplying steel to the molding and forming means, which usually include casting devices and a roller mill.

It is one object of the invention to improve the above described construction, and to provide a steel plant permitting the crude iron to be heated to a higher temperature.

Another object of the invention is to provide means for mixing in a particularly advantageous manner, scrap iron with crude iron produced by a blast furnace.

With these objects in view, the present invention relates to an improved steel plant of the type using movable converters.

One embodiment of the invention comprises converter means movable along a path; blast furnace means located on one side of the path; hearth furnace means having a position adjacent the blast furnace means for receiving molten crude iron from the same; steel molding and forming means, such as casting devices and roller mills, located on the other side of the path; and treating means located along the path for transforming iron in the converter means into steel.

The converter means are movable along the path, preferably on tracks, between a position located adjacent the hearth furnace means, and a position for supplying steel to the molding and forming means. While the converter means are located on the path, the iron therein is treated by oxygen blown into the same and transformed into steel. The treating station with the necessary blowers is located along the path, preferably on the other side of the same. The steel molding and treating means preferably extend along parallel lines transverse to the path on the other side of the same, and ladles are provided for receiving steel from the converter means after the same have moved away from positions cooperating with the blast furnace means and with the blower means. Preferably, cranes are provided for transporting the ladles to a high level so that the steel in the same can be directly poured into the inlet of molding or casting devices.

The hearth furnace is heatable in the manner known from cupola furnaces so that the iron discharged from the blast furnace can be heated to any desired temperature, before being poured into the converter in which a suitable amount of scrap iron has been already deposited.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic plan view of a steel plant according to an embodiment of the invention; and FIG. 2 is a schematic side elevation illustrating the embodiment of FIG. 1.

Referring now to the drawing, a blast furnace 1 is supported on a high level by a supporting framework 2, and has one or several outlet openings leading to a gutter 3 so that the crude iron flows into a hearth furnace 4 located at ground level below gutter 3.

Hearth furnace 4 is tiltable about the horizontal axis for discharging heated iron into the opening on top of a converter 5 which is tiltable to an inclined position, as shown in broken lines in FIG. 2, for receiving iron from the hearth furnace, and an upright position. Before iron is poured into converter 5, scrap iron is charged into the converter.

Converter 5 is mounted on a carriage 7 for movement along tracks 8 which permit transport of the converter from the position shown in solid lines in FIG 1 to the position shown in broken lines, and also to intermediate positions.

The treating stand 9 (schematically shown) comprises oxygen supply lances, smoke hood and other accessories. The oxygen lances (not shown) supply oxygen to the charge in converter 5 while the same is still in the position located opposite the hearth furnace 4, but it is also possible to place the treating station in which blower means 9 are provided, spaced from the hearth furnace 4 along the path defined by tracks 8. In this event, the converter is moved along tracks 8 from the position shown in solid lines to an intermediate position in which the steel is treated by blower means, e.g. oxygen supplying lances.

Molding and forming means for the steel are provided along parallel lines which are transverse to the direction of the path along which converter 5 moves along tracks 8. In the illustrated embodiment, two continuous casting devices have inlets 10' located adjacent the path provided by tracks 8, but on the side of the same remote from blast furnace 1. Ladle means 10 are provided along tracks 8 at a level lower than the tracks so that converter 5, when moved to a position located in the region of a ladle 10, can be tilted to a position for discharging the steel into a ladle 10.

Crane means 11 are provided for lifting ladles 10 filled with steel to a higher level, and for transporting the same to a position located above the inlet 10' of one or the other continuous casting devices into which the steel is poured. A rope 12 is formed by each casting device upon receiving steel, and the respective ropes of steel are divided by dividing means 13, and transported to a roller mill 14 where the solid steel is rolled and further formed.

During the operation of the steel plant, iron is discharged from blast furnace 1 into the hearth furnace 4, heated in the same to the desired temperature, and then discharged into converter 5 which has been previously placed in a position located adjacent hearth furnace 4, and charged with the necessary amount of scrap. The iron is treated with oxygen provided by lances at the treating station, which is shown to be located on the side of tracks 8 remote from blast furnace 1 and hearth furnace 4 directly opposite the hearth furnace, but the treating station 9 can be placed in another position along tracks 8.

When the iron has been converted into steel, converter 5 is moved on its carriage 7 along the path defined by tracks 8 until located opposite a ladle 10 which was placed by crane 11 at a lower level so that the steel can be discharged from converter 5 into a ladle 10 which is thereupon raised by crane 11 to a position located above the inlet of one of the casting devices 10'. While one of the ladles is tilted by crane to discharge the steel into the respective casting device, another ladle may be filled by the converter in a position further displaced along tracks 8. The ladles are alternately raised by a crane 11 to supply steel to one or the other of the casting devices so that a continuous operation can be achieved.

It will be understood that each of the elements described above, or two or more together, may also find a useful application in other types of steel plants differing from the types described above.

While the invention has been illustrated and described as embodied in a steel plant including a furnace between a blast furnace and a converter for preheating iron before being filled into the converter, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a steel plant, in combination, converter means movable along a path; blast furnace means located on one side of said path; hearth furnace means located between said blast furnace means and said path for receiving molten iron from said blast furnace means and for discharging the heated iron into said converter means while the same are located on said path; steel molding and forming means located on the other side of said path extending along at least one line transverse to said path and spaced along the same from said hearth furnace means; and treating means located along said path for transforming iron in said converter means into steel while said converter means are located on said path so that said converter means receives iron from said hearth furnace means in a first position on said path and discharges steel in a second position on said path for supplying said steel molding and forming means.

2. A steel plant according to claim 1 wherein said converter means are in said first position located adjacent said hearth furnace means.

3. A steel plant according to claim 1 wherein said treating means is located on said other side of said path.

4. A steel plant according to claim 1 wherein said treating means is located in the region of said hearth furnace means and of said blast furnace means on the other side of said path.

5. A steel plant according to claim 1 and including track means along said path for supporting said converter means on said path at a lower level than said hearth furnace means so that iron can be poured from the same into said converter means in said first position.

6. A steel plant according to claim 5 wherein said hearth furnace means is mounted for tilting movement for discharging iron into said converter means.

7. A steel plant according to claim 1 and including ladle means located on said path movable between a receiving position for receiving steel from said converter means in said second position, and another position for discharging steel into said molding and forming means.

8. A steel plant according to claim 7 wherein said ladle means in said receiving position are located at a lower level than said converter means in said second position.

9. A steel plant according to claim 7 and including crane means for moving said ladle means from said receiving position to said other position, said other position being higher than said receiving position.

10. A steel plant according to claim 1 including a plurality of steel molding and forming means located on said other side of said path and extending along parallel lines perpendicular to said path; ladle means movable along said path between said lines between a receiving position located at a low level for receiving steel from said converter means in said second position, and discharge positions located at a high level above said molding and forming means on said lines; crane means for transporting said ladle means between said receiving and discharge positions; and wherein said converter means are located in said first position at a lower level than said hearth furnace means; and wherein the latter are tiltable for discharging iron into said converter means in said first position.

References Cited by the Examiner
UNITED STATES PATENTS

| | | | |
|---|---|---|---|
| 361,653 | 4/1887 | Strobel | 266—13 |
| 405,491 | 6/1889 | Lindenthal | 266—13 |
| 513,099 | 1/1894 | Ford | 266—13 |
| 2,886,304 | 5/1959 | Guthrie | 266—33 |
| 3,013,789 | 12/1961 | Sayer et al. | 266—13 |

JOHN F. CAMPBELL, *Primary Examiner.*

L. J. WESTFALL, *Assistant Examiner.*